United States Patent [19]

Bitter et al.

[11] Patent Number: 5,046,030

[45] Date of Patent: Sep. 3, 1991

[54] METHOD AND APPARATUS FOR DYNAMIC REMAPPING OF VIDEO SWITCHER CONTROL INPUTS

[75] Inventors: David W. Bitter, Newark, Calif.; Anthony E. Zortea, Exeter; Douglas C. Crawford, Pottstown, both of Pa.

[73] Assignee: Videotek Incorporated, Pottstown, Pa.

[21] Appl. No.: 481,505

[22] Filed: Feb. 16, 1990

[51] Int. Cl.$^5$ .................. G01D 18/00; G09G 3/02
[52] U.S. Cl. .................. 364/571.02; 364/571.08; 340/706
[58] Field of Search .................. 364/571.01, 571.02, 364/571.04, 571.08; 340/706, 709, 710, 721; 358/22, 180, 181, 182, 183

[56] References Cited

U.S. PATENT DOCUMENTS

| | | | |
|---|---|---|---|
| 3,728,479 | 4/1973 | Srinivasan | 352/182 |
| 3,758,712 | 9/1973 | Hudson | 358/183 |
| 3,989,888 | 11/1976 | Busch et al. | 352/182 |
| 4,561,049 | 2/1985 | Deleganes et al. | 364/130 |
| 4,668,989 | 5/1987 | Mackereth | 358/182 |
| 4,713,695 | 12/1987 | Macheboevf | 358/183 |
| 4,794,388 | 12/1988 | Matthews | 340/731 |
| 4,912,672 | 3/1990 | Giorgio | 364/900 |
| 4,935,728 | 6/1990 | Kley | 340/709 |

Primary Examiner—Kevin J. Teska
Assistant Examiner—Thomas S. Auchterlonie
Attorney, Agent, or Firm—Eckert Seamans Cherin & Mellott

[57] ABSTRACT

A remapping apparatus and method dynamically map the endpoints of a manual control to scaled and shifted values of a controlled parameter magnitude, such that the full span of the control corresponds to transition of a controlled parameter between desired endpoints, normally over less than the full possible span of transition. The mapping is recalculated repetitively and accounts for constraints on the controlled parameter resulting from variations in related parameters. The apparatus and method are especially applicable to controlling transition effects produced by a video switcher. A digital computer senses the position of the control and registers the level of a controlled parameter (and preferably also the level of constraining related parameters). The computer provides a control input to a magnitude control device, varying in response to changes in the control, but recalculating the relationship of incremental changes in the control to incremental changes in the controlled parameter, maintaining a scaled and shifted relationship in which the remaining span of the control to the end of its full span corresponds linearly to the remaining span of the controlled parameter to reach its endpoints.

9 Claims, 2 Drawing Sheets

METHOD AND APPARATUS FOR DYNAMIC REMAPPING OF VIDEO SWITCHER CONTROL INPUTS

BACKGROUND OF THE INVENTION

1. Field of the Invention

This invention relates to the field of manually operable continuous controls, and in particular to a method and apparatus for digitally scaling and shifting the outputs of manual control devices such as potentiometers and the like which form the inputs to a video switcher. Levels produced by the potentiometers or the like are remapped for optimum use of the available control range in effecting a desired range of a transition. The scaling and shifting are done dynamically to adapt to the particular range of a transition, which may be dynamically affected by changes in related parameters, employing the full available range of the manual control device to correspond to the span of a desired transition making up an effect.

2. Prior Art

Manually operable control devices such as potentiometers or other mechanically variable means for producing corresponding variable electrical outputs are well known, for example as volume or level controls. Potentiometers used for such control devices typically are connected to produce a variable analog level of current, voltage, etc. as a result of the manually adjustable resistance between a movable wiper and one or both of the terminals of a resistor over which the wiper can be moved. Similar controls are also known with variable capacitance, inductance, and other parameters, however, the typical control uses a potentiometer and this form of device is discussed herein for purposes of illustration. In a typical application, the variable resistance of the potentiometer is connected to provide variable gain in an amplifier, variable biasing voltage, or otherwise arranged to produce the desired corresponding variation in the output.

Control devices have a useful control range defined by the maximum and minimum variation (e.g., in resistance) of which the control device is capable due to its physical parameters such as the series resistance between the terminals, the range of possible physical displacement of the wiper and the like. The full span of the useful range may or may not actually be needed in effecting a particular transition in the controlled parameter. When designing a control based on these manually variable devices, the engineer chooses the elements of the circuit such that the full range of all possible transitions is available to be utilized as necessary. However, a particular desired transition may not need the whole range of the control device. During a partial scale transition, the control device is moved over only a limited proportion of its full range, or if moved over the whole range typically has no effect on the controlled output for most of its range. The useful range of variation of the output occurs over a very limited range of the physical displacement of the control device.

To some extent, the various parameters in a transition effect to be controlled by a video effects switcher are related to one another. For example, if transitions in parameters affecting the size and/or position of a geometric pattern are to occur together, the operator normally must ensure that the combination of the variations in the parameters is not such as to place the geometric pattern off the scale, i.e., outside the displayable video field. Therefore, in addition to the fact that a transition in a parameter may not need the full possible range of its control, transitions in related constraining parameters may dynamically affect the extent of variation available in a particular parameter.

Controls producing an electrical level or the like are known to be useful for producing a continuously variable input to a digital processor which uses the control as a data input. This type of input is used, for example, to control the transitions accomplished in video switchers. The control potentiometer terminals are connected to fixed voltages and the wiper is connected to an analog to digital converter. The numerical output of the analog to digital converter is then sampled periodically and the digital processor effects the time-varying output which is manually changed by the operator in manipulating the control device.

The transitions controlled using a video switcher or video effects switcher may involve a partial change or a full span change over a time period of more than one video frame, from one video input signal to another. Typical switched effects are the "wipe" and the "mix," and other effects of a similar nature are also possible. A wipe is the insertion of one video signal into another, where the insertion is a predetermined shape, usually a geometric pattern. The pattern has certain variable parameters such as position, size, aspect ratio, border width, edge softness, etc. As the transition proceeds, for example under operator control using a manually variable electrical element such as a potentiometer, the pattern can be made to grow, shrink or otherwise vary. As a typical wipe proceeds, the geometric pattern grows or shrinks to reveal the new video signal on or in place of the previous video signal. A mix is a comparable time-varied transition where the full frame of video dissolves into a new frame.

It is frequently a design compromise to have the full mechanical range of displacement of a control device correspond directly with the full range of variation in the electrical output to be controlled, to cover the set of all possible parameter transitions, whereas most transitions require only a limited range within the full range possible. However, according to the invention, the full mechanical range of displacement is applied to any particular transition by remapping the full range of output of the control to cover only that portion of the available span of the output that will be used in effecting a particular desired transition, and to control the variation within this span as linearly as possible. In this manner, the user enjoys the most possible control over progress of the transition, and the full range of the manual control is always employed to control transitions through larger or smaller output ranges (according to the parameters of a particular effect) within the total available span.

"Transition magnitude" can be defined as a measure of the extent to which any parameter involved in a transition has proceeded and can be expressed, for example, as a percentage of the full available span of the controlled parameter. In known video switchers, the transition magnitude is indirectly controlled by an operator, using a transition controller which traditionally is a lever arm connected to a potentiometer, the lever mounting and the resistance span of the potentiometer defining an upper limit and a lower limit. Often the operator can also specify the number of video fields or frames which the transition should span, this being done via a digital interface. The user can specify manually the starting and ending transition magnitudes for a transition, and this is one of the reasons that a particular transition may require a limited range of the parameter within the total available span. The various parameters of the transition can be static or can change during the transition; and this is another reason that a particular transition may require only a partial span of the controlled parameter (because the instantaneous value of any non-controlled parameter can constrain the useful range of the controlled parameter). For example, a circle wipe with a border parameter of two inches, where the controlled parameter is the circle size, could require a useful size span of four units. But a circle wipe with a three inch border could require a useful size span of five units. Moreover, the set of all possible circle wipes could require a total size span of ten units. The prior art would map the full physical range of the control to ten size units for both the two and three inch border transition examples noted above, whereas the present invention would map the full physical range of the control to four size units in the two inch border transition, and five size units in the three inch border transition.

A transition is accomplished by controlling a type of video processor subsystem that has two or more video signals as inputs, one video signal as the output, and at least one control input that determines what combination of the video inputs will be present in the output. During a given video field, the controlled parameter as set by the input or inputs for a transition can be static during the transition, yielding a mix, or dynamic, yielding a wipe, matrix or the like. A transition occurs when the controlled parameter and/or control input changes over a predetermined number or sequence of fields so that the video output goes from one combination of the inputs to another combination. The control input magnitude is thereby related to the transition magnitude of each parameter which is set or changed during the transition.

During a complete transition, the user plans the effect parameters and how they will change (if at all) during the transition, then moves one or more lever arms or other similar control devices from the desired lower limits to the desired upper limits. As the transition controller responds to the control input(s), the transition magnitude of the controlled parameter is changed over time from one value to another. These desired transition magnitude endpoints, however, are a function of all the effect parameters, and for different levels and combinations of the parameters, the magnitude endpoints required to complete the transition are likewise different. For example, one might wish to have the transition magnitude of the field size or the like change only from 45% of its maximum to 55% during the transition. In that case, the operable portion of the displacement of the control device throughout the entire transition would be limited to the passage of the control device through an area very close to its midspan. Manually selectable transition magnitudes that lie outside of the required endpoints for a particular transition will have no effect on the output.

The prior art discloses the use of potentiometer controls and the like to control video switchers, for example as shown in U.S. Pat. Nos. 3,728,479 - Srinivasan; 3,989,888 - Busch et al; and, 3,758,712 - Hudson, the latter also disclosing placing switch contacts at the extremes of the span of the control device to provide further inputs to circuits controlling a transition. These disclosures show the use of control devices of the present type, but do not address the problem of ensuring that the span of the control device and the possibly limited span of transition magnitude between the desired endpoints are optimized such that the full span of the control device corresponds to the span of the change desired in the transition magnitude between the endpoints.

U.S. Pat. Nos. 4,668,989 - Mackereth and 4,713,695 - Macheboeuf disclose video switchers that attempt to digitize or optimize a change in transition magnitude over an effect. These patents also do not disclose the possibility of optimizing the range of the control device used for setting transition magnitude to the range of desired change in the transition magnitude throughout the progress of a transition or similar effect.

The fact that different effect parameters require different spans of transition magnitudes, and in particular different endpoints for the parameters changed over the transition, poses a problem for known video effects switchers. It is preferable that the user have the greatest possible ability to control the transition that is possible with a given control device (i.e., variable adjustment means). The control device should begin to affect the transition magnitude of the controlled parameter immediately when the control device for adjusting said magnitude is moved off its lower limit and the end of the span of the control device should be reached precisely when the transition magnitude reaches the desired upper limit, which may or may not be the upper limit of the full range of the controlled parameter. If the transition begins only after the control device is off its lower limit and/or end when the control device is below the upper limit, then the control device or the transition controller has "dead space" and this reduces the expression resolution available for the user attempting to control the effect. If the transition is made to occur within the span but appears abruptly, for example at the control device's lower limit, or if the transition is not completed when the control device reaches the upper limit, then the desired transition effect has not been obtained.

To attempt to encode the full mechanical span of a control device for selection of a desired change in transition magnitude of a parameter in transition, the prior art has adopted mapping of the full span of the output of the control device to the limits of transition magnitude of which the processor is capable. The lower limit of the control device can be mapped to the minimum possible magnitude of the transition magnitude. The upper limit of the control device is mapped to the maximum maximum possible transition magnitude. This technique results in dead space for most transitions because the selected maximum and minimum transition magnitudes will not always correspond to the full possible deflection. Therefore, the operation of the device is such that the control device will have no effect on the controlled parameter until off the lower limit and the operable span during which changes occur in the controlled parameter will be complete before the control device reaches its upper limit.

Some video switchers have provided a reduced level of mapping based on one particular effect parameter such as geometric pattern position. The full span of the control device is mapped to a limited span of the controlled parameter, the limited span endpoints, (e.g., desired maximum and minimum transition magnitudes) being a function of the parameter being controlled. This technique still yields controller dead space for most levels of complex effect because it does not account for all the effect's parameters, which may be interrelated. The technique of mapping the full range of a control device to the full range of the parameter, and limited mapping (full range of control to limited range of parameter) is illustrated in FIG. 3. Whether the control is based on the full range of the electrical variation possible between manual endpoints 72, 74 using the manual element 20 and potentiometer 30 or the like from the maximum possible 92 to the minimum possible 94 (solid arrows in FIG. 3) or whether the control is based on mapping a desired fractional part of the full range of electrical variation (dashed lines in FIG. 3), in either case, dead space 90 results.

The present invention takes a different approach than the known techniques in that the control device span is mapped dynamically to the magnitude of the controlled parameter for each desired effect, being recalculated at every video field. During a present video field, the parameter magnitudes (i.e., the transition magnitudes) are read and are used together with the control device setting to calculate a new mapping relationship between incremental changes in the control device setting and controlled changes in transition magnitude as required to move toward the desired endpoint of the planned transition magnitudes. The recalculation is accomplished by adjusting the output dynamically, by an amount which will ensure that the span of the control device will be used up at the same time that the transition magnitude reaches the desired endpoint. The result of this technique is illustrated in FIG. 2, wherein regardless of the endpoints or the span of a particular transition, the full manual range of the control device is caused to correspond to the required range of the effect. The process involves scaling and shifting the detected difference in the level set by the control device by the ratio of the change in transition magnitude to the distance yet to go toward the endpoint. The endpoint can be constrained, also dynamically, where changes in related parameters are such as to move the previous endpoint off the scale. The invention results in a transition controller with no dead space, and without any abrupt starting or stopping of the transition at a limited area of the control device span. The invention achieves excellent control accuracy and linearity but does not require expensive additional hardware because the remapping is done by calculations conducted by the video effects processor.

SUMMARY OF THE INVENTION

It is an object of the invention to maximize the sensitivity and versatility of a continuously variable controller driven by an input derived from a manually variable electrical control device.

It is another object of the invention to make full use of the span of a continuously variable control device, even where the control device is to be used to vary a controlled parameter only within a limited span of the controlled parameter's range.

It is still another object of the invention to remap the relationship of movement of a control device to changes in the parameter to be controlled using the control device, in a dynamic manner enabling usage of the full span of both the controller and the controlled parameter when desired, but avoiding dead space in the control device.

These and other object are accomplished by a remapping apparatus and method which dynamically maps the endpoints of an input derived from a manual control device to scaled and shifted values of a controlled parameter magnitude, such that the full span of the control device corresponds to transition of a controlled parameter between desired endpoints, normally over less than the full possible span of transition. The mapping is recalculated repetitively and accounts for constraints on the controlled parameter resulting from variations in related parameters. The apparatus and method are especially applicable to controlling transition effects produced by a video switcher. A digital computer senses the position of the control device and registers the level of a controlled parameter (and preferably also the level of constraining related parameters). The computer provides a control input to a magnitude regulating device, varying in response to changes in the control device, but recalculating the relationship of incremental changes in the control device to incremental changes in the controlled parameter, maintaining a scaled and shifted relationship in which the remaining span of the control device to the end of its full span corresponds linearly to the remaining span of the controlled parameter to reach its endpoints.

A manually variable control device sets a magnitude of a controlled parameter between a maximum and a minimum during a period of transition, producing an electrical output which varies in response to position of the movable part. A magnitude regulating device is operable to set the level of the controlled parameter in response to an input to the magnitude regulating device, and the remapping device is operable to sense the electrical output of the control device and to sense or register the level of the controlled parameter, the remapping device providing the input to the magnitude regulating device and changing the input to the magnitude regulating device in response to changes in the electrical output of the control device according to a dynamically recalculated relationship whereby the full physical displacement of the manual control device always covers only the useful portion of the transition.

The manually variable control device is typically a potentiometer having a physically determined span corresponding to a span of voltage variation. This voltage is digitized via an analog to digital (A to D) converter and a processor operates on the output of the A to D converter to adjust the output to a remapped number which varies over a full transition span. The preferred application of the device involves managing a transition in a video effect, such as a wipe, fade or the like. The remapping device encodes displacement of the control device within the available span differentially, based upon the proportion of the control device displacement, to the remaining displacement to reach a maximum or minimum extreme of displacement. As a result, a given movement of the manually movable control device translates linearly into an appropriate change in transition magnitude of the controlled parameter, appropriate in that it is the exact change necessary to match the physical limit of the manual control device to the desired maximum or minimum of the transition magnitude; and the full available span of the control device is usefully employed in managing the effect.

The method of the invention concerns adjusting the output of the control device to correspond in range to exactly the full useful span of the input to a magnitude regulator and to recalculate the remapping every video field, to account for the changing of any other parameter. This involves the steps of encoding the current level of the control device output as well as the maximum and minimum level, which maximum and minimum levels can be changed by changes in related parameters, then proportionally scaling and shifting any change in the control device output by a fraction whose numerator is the remaining displacement to reach the maximum or minimum and whose denominator is the previous remaining displacement. In this manner, the displacement of the manual control device between its maximum and minimum positions corresponds, for all transitions and with any set of parameters to the displacement of the magnitude regulator between its desired maximum and minimum, and no portion of the available control span is wasted on dead space.

BRIEF DESCRIPTION OF THE DRAWINGS

There are shown in the drawings the embodiments of the invention as presently preferred. It should be understood, however, that the invention is not limited to the precise arrangements and instrumentalities shown in the drawings and is capable of embodiment in other configurations and groupings of its sub-elements in accordance with the invention as defined in the appended claims. In the drawings.

DETAILED DESCRIPTION OF THE PREFERRED EMBODIMENTS

Figure 1:
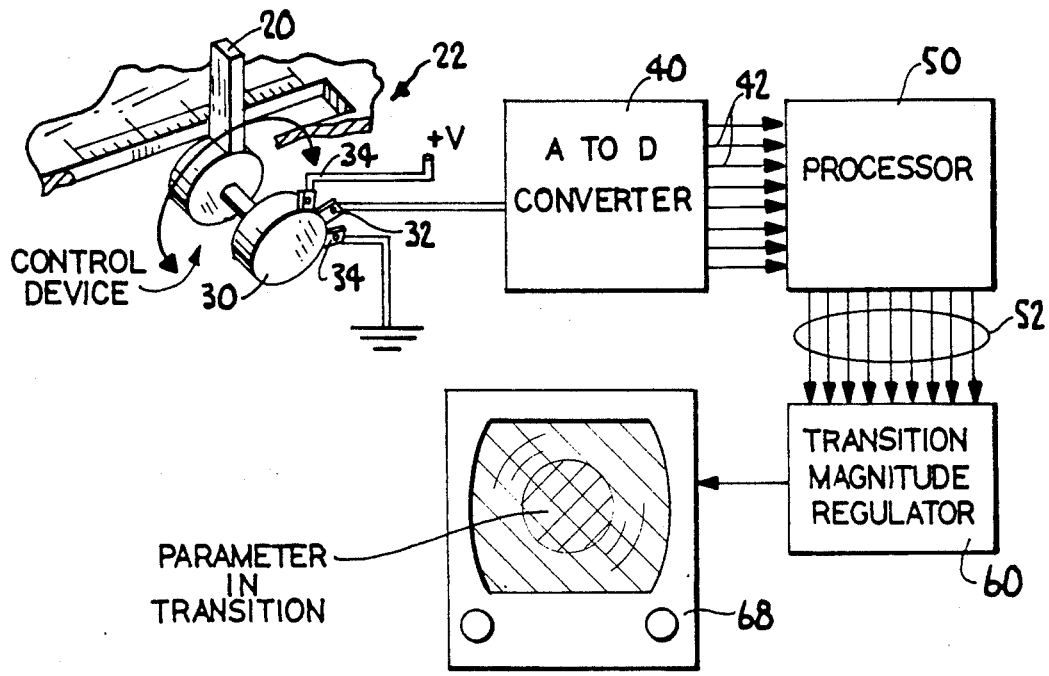
FIG. 1 is a partially schematic view showing the manual control device, remapping means and magnitude regulator of the invention.

The apparatus of the invention encodes the electrical output of a potentiometer 30 or similar control device to correspond to the full span of desired displacement available to the regulator 60 which varies parameters in a controlled apparatus 68. This is accomplished by remapping incremental changes (e.g., 101 to 102) in the sensed displacement of the manually controlled element 20 of the control device 22 before presenting the changes as inputs to the controlled apparatus 68. The apparatus is shown in FIG. 1. Manually movable element 20 produces an electrical level (e.g., voltage) via a potentiometer 30 connected by its terminals 34, 34 to a supply voltage and to ground, respectively, and by its wiper 32 to an input to analog to digital converter 40. A to D converter 40 digitizes the level at wiper 32 and provides a numerical output indicating the level at digital outputs 42.

According to known apparatus, the output of an A to D converter would be applied directly as the input to a magnitude regulator 60, the magnitude regulator then using this input as indicating the currently desired state of an effect to be reproduced on a controlled apparatus 68. The controlled apparatus is, for example, a video mixer or effects switcher, a video recorder, transmitter or display, and the controlled effect may be any changeable parameter of the video signal. In executing a wipe or fade, for example, the apparatus proceeds at a manually controlled rate between recording/transmitting or displaying one video input signal and another. Other parameters such as the size of a window produced in the display, the brightness or hue, or other attributes which are to be continuously adjustable over a range, can be controlled in a comparable manner.

The difficulty with applying the digitized electrical level directly to the of the magnitude regulator input is that the endpoints 72, 74, of the manual control element 20, the electrical level producing element 30, the A to D converter 40 and the magnitude regulator 60 do not always correspond to controlled effects desired parameter endpoints 103, 104 unless an effect is to proceed between zero and the maximum possible. According to the prior art, the relationship of these elements is fixed.

The maximum and minimum possible levels 92, 94 of magnitude in effecting a transition are fixed functions of the system. The maximum and minimum possible values 92, 94 for the transition magnitude, however are only one possibility for endpoints between which a user may wish to pass. If a planned effect requires displacement during a transition from between two endpoints 103, 104, which occur at midpoints between the maximum and minimum possible parameter levels, the transition must be controlled using only so much of the span of the manual control device as falls between the two endpoint levels 101, 102 that correspond to the desired controlled parameter levels 103, 104. For example, if an effect requires adjusting a window size between 25 and 35% of the possible field (which of course could range from zero to 100%), the transition will be effected over a very limited portion of the span of the manual control device. Outside of the 25-35% effective span, the manual control device has no effect. The actual transition magnitude desired maximum and minimum fall within the possible maximum and minimum, rendering the manual control device of limited usefulness in manually effecting a smoothly executed transition between the desired endpoints.

Figure 3:
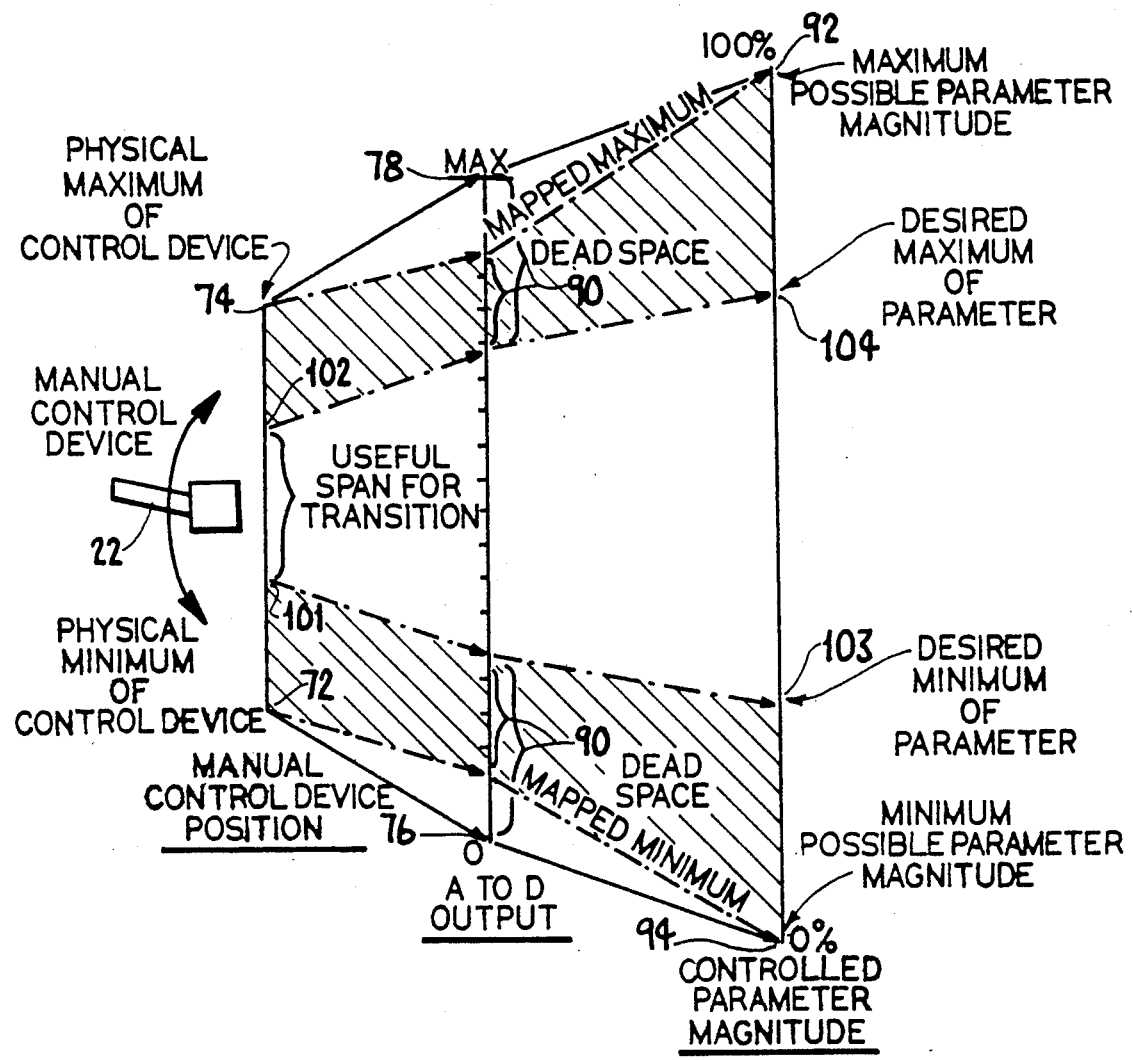
FIG. 3 is a line diagram corresponding to FIG. 2, showing the correspondence of ranges of a manual control device and an effect range according to the prior art.

FIG. 3 illustrates the range of the manual control device (i.e., the combination of the movable control lever 20 and the potentiometer 30) as well as the ranges of voltages presented to the A to D converter 40 and the corresponding change in the magnitude regulator parameter via regulator 60. As shown in the drawing, the full manual range 72 to 74 does not correspond to the range of the desired transition 103 to 104 except in the special circumstance where the desired transition is to run between the maximum value 92 and minimum value 94 of the controlled effect parameter, and as constrained by other parameters can run over this full span without going off scale. At the low extreme 72 of the manually movable element (defined by the movable lever abutting the end of its slot or by a stop in the potentiometer), there may still be a non-zero voltage applied to the A to D input, as shown by a dashed line. At the high extreme 74 of the manual device 22 (also defined by the physical configuration of the lever 20, potentiometer 30 and the like), the electrical level may be less than the maximum 78 which could be encoded by the A to D converter, as shown by a dashed line. It is possible to map the output of the A to D converter to correspond to a particular span of proportionate control of an effect parameter such that the lowest output 72 of the potentiometer 30 is interpreted as zero and the highest output 74 as 100%. However, in that case the maximum and minimum are still fixed. The desired transition between endpoints of parameter values for any transition that proceeds between endpoints 103, 104 other than zero and 100% does not encompass the full range of movement of the manual control device.

Figure 2:
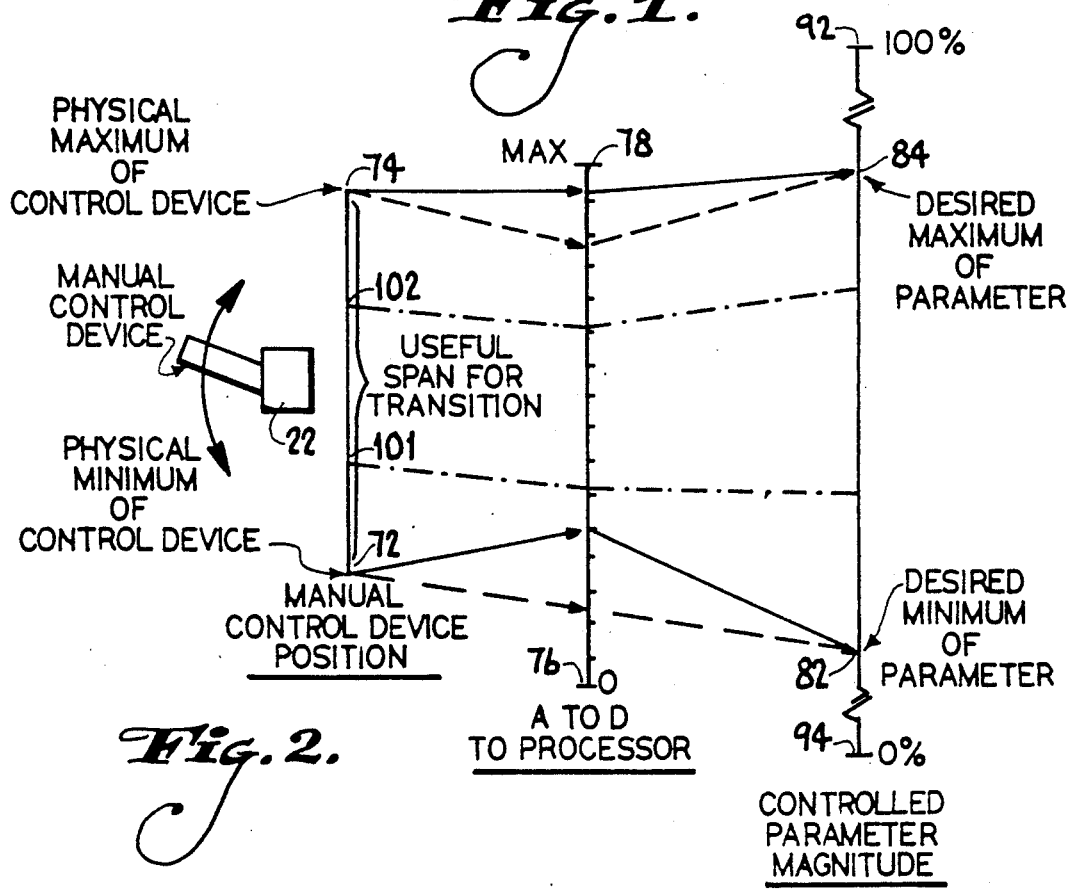
FIG. 2 is a line graph showing the correspondence of the manual control device input range to the effect range according to the invention.

According to the invention, the transition magnitude is calculated repetitively, for example for every field of a video signal. Accordingly, the span 72 to 74 of the manual control device is made to correspond dynamically with the progression between the desired endpoints 82, 84 of an effect transition, regardless of whether the effect transition is to cover the maximum possible range of control, and especially regardless of whether endpoints 82, 84 are changing every field. This feature is shown in FIG. 2. The invention thus dynamically and differentially scales the effect of a sensed displacement of the manual control device based upon the present values of the transition magnitude, upon previous values and upon the desired transition endpoints. Whatever the desired displacement 82 to 84 in the controlled effect parameter, the remapping translates the output of the potentiometer 30 such that the desired displacement will correspond to the full displacement of the manually movable control device 20. Preferably, remapping is accomplished numerically by a processor 50 disposed between the A to D converter 40 and the magnitude regulator 60, that translates differential changes 101 to 102 in the control device 20 as sensed at the outputs 42 of the A to D converter to changes in the processor output 52, presented to the magnitude regulator 60 as the input defining the present status of a controlled parameter such as the proportionate levels of two video signals to be mixed or wiped together. Processor 50 repetitively samples the output of the A to D converter 40 and calculates a numerical transition magnitude figure between a preset maximum and minimum 84, 82. The transition magnitude figure is applied as the input to magnitude regulator 60. This remapping is recalculated every video field to account for potential changes in the desired transition magnitude maximum and minimum 82, 84.

Scaling and shifting of differential changes in the transition controller level at input 52 (i.e., scaled and shifted changes in the numerical output of the A to D converter as input to the magnitude regulator 60) can be accomplished according to the following calculation, where "n" indicates the present sample and the transition magnitude$_{(max)}$ and transition magnitude $_{(min)}$ are as shown at 84 and 82, respectively, in FIG. 2:

IF:

Control Device$_{(n)}$ $\geq$ Control Device$_{(n-1)}$,

THEN:

Transition Magnitude$_{(n+1)}$ = Transition Magnitude$_{(n)}$ +

(Control Device$_{(n)}$ − Control Device$_{(n-1)}$) *

$$\left\{ \frac{\text{Transition Magnitude}_{(max)} - \text{Transition Magnitude}_{(n)}}{\text{Control Device}_{(max)} - \text{Control Device}_{(n-1)}} \right\};$$

IF:

Control Device$_{(n)}$ < Control Device$_{(n-1)}$,

THEN:

Transition Magnitude$_{(n+1)}$ = Transition Magnitude$_{(min)}$ +

Control Device$_{(n)}$ *

-continued $$\left\{ \frac{\text{Transition Magnitude}_{(n)} - \text{Transition Magnitude}_{(min)}}{\text{Transition Magnitude}_{(min)}} \right\}.$$

This calculation is accomplished repetitively. For video switcher control applications, the output of the A to D converter 40 is preferably sampled once for each video field ("n") and the transition magnitude applicable to the next video frame ("n+1") is calculated. Using this calculation to dynamically adjust the transition magnitude based upon the current and previous values, and upon any limitations which are presented by changes in the other parameters of the video effect transition as a whole, the apparatus produces a transition control apparatus with no dead space and no abrupt starting and stopping of the transition at intermediate points along the span of motion of the manual control device. Preferably the calculation is done in software, and accordingly is inexpensive and relatively easy to implement.

The operation of the apparatus can be appreciated by examining the effect of the proportionate scaling and shifting according to the invention in particular circumstances. Assuming the transition as to a certain parameter is to vary from 25% to 35% of the span between the possible maximum and minimum of which magnitude regulator 60 is capable, this being defined by the system, while the manual control device moves from minimum 72 (zero) to maximum 74 (100%), and assuming further that the control device 20 is moved in 10% increments between successive samples, the transition magnitude output by magnitude regulator 60 in view of the input 52 from processor 50 increases from 25% to 35% in 1% increments. Therefore, the full span 72 to 74 of the manual control device 20 is devoted to the span of the transition magnitude between the desired endpoints 82 to 84. Moreover, the relationship of the manual control device position and the progress of the controlled effect is linear and is independent of the particular endpoints which may be chosen for use in the transition. The same procedure linearly relates the control device displacement from zero to 100% to changing of the controlled effect parameter between any desired endpoints, regardless of where the endpoints fall in the full possible span. The full span of the control device is made to correspond in each case with the desired span of the controlled parameter by differentially scaling and shifting the displacement of the controlled parameter from sample to sample (e.g., frame to frame).

The invention uses a method of scaling and shifting a transition controller input to correspond to the level required for a controlled transition magnitude output. The user defines the endpoints of transition magnitude through a desired span of a transition, and simply advances the manual control device from its minimum to its maximum (or vice versa). The processor 50 scales and shifts the span 72 to 74 of input control range to proportionately correspond to the desired span 82 to 84 of the transition magnitude, setting an initial transition magnitude equal to the lower endpoint of the desired transition magnitude, and setting subsequent levels of the transition magnitude, as calculated repetitively, to scaled values corresponding to values at the input of the transition controller needed to use the full manual input scale to achieve displacement of the output between the desired endpoints. The calculation of a next ("n+1")

transition magnitude is preferably a differential scaling and shifting of the transition controller input, based upon the present ("n") and previous ("n−1") levels of the input to the transition magnitude regulator 60 which sets the transition magnitude, as well as on the overall range 82 to 84 of the desired transition at the input (and output) of the magnitude regulator 60, and all other parameters of the effect.

The invention as disclosed is a manually variable control apparatus for setting a magnitude of a controlled parameter between a maximum and a minimum during a period of transition, comprising: a control device having a movable part 20 and producing an electrical output 32 which varies in response to position of the movable part 20; a magnitude regulator 60 operable to set the level of the controlled parameter in response to an input 52 to the magnitude regulator 60; and, a scaling and shifting means 50 operable to sense the electrical output 32 of the control device and to sense the level of the controlled parameter, the scaling and shifting means 50 providing the input 52 to the magnitude regulator the scaling and shifting means 50 changing the input 52 to the magnitude regulator 60 in response to changes in the electrical output 32 of the control device 20, 30, and the scaling and shifting means 50 reducing changes in the input to the magnitude regulator 60 relative to corresponding changes in the electrical output 32 of the control device 20, 30, proportionately as a function of said maximum and minimum.

The control device can include a potentiometer 30. Preferably, the magnitude regulator 60 is a video controller and the controlled parameter is an attribute of a video output. The remapping (scaling and shifting) means 50 can be a digital processor which repetitively adjusts the magnitude of the controlled parameter by an amount scaled and shifted in proportion to displacement to reach a desired endpoint, according to a calculation:

IF:

Control Device$_{(n)}$ ≧ Control Device$_{(n-1)}$,

THEN:

Transition Magnitude$_{(n+1)}$ = Transition Magnitude$_{(n)}$ +

(Control Device$_{(n)}$ − Control Device$_{(n-1)}$) *

$$\left\{ \frac{\text{Transition Magnitude}_{(max)} - \text{Transition Magnitude}_{(n)}}{\text{Control Device}_{(max)} - \text{Control Device}_{(n-1)}} \right\};$$

IF:

Control Device$_{(n)}$ < Control Device$_{(n-1)}$,

THEN:

Transition Magnitude$_{(n+1)}$ = Transition Magnitude$_{(min)}$ +

Control Device$_{(n)}$ *

$$\left\{ \frac{\text{Transition Magnitude}_{(n)} - \text{Transition Magnitude}_{(min)}}{\text{Transition Magnitude}_{(min)}} \right\}.$$

The invention can also be considered the method for setting a magnitude of a controlled parameter, comprising the steps of: computing endpoints 82, 84 for the controlled parameter during a transition to be accomplished; producing an electrical level 32 by varying a position of a manual control device 20 over a full span 72 to 74 of the control device 20; sensing the electrical level 32 and a controlled level 52 of the controlled parameter; and, remapping the electrical level and controlling the controlled parameter to a parameter level within said endpoints 82, 84 by proportioning a displacement of the controlled parameter as a function of a remaining displacement to reach one of the endpoints, whereby the full span 72 to 74 of the manually controlled device 20 corresponds to a transition of the controlled parameter between the endpoints 82 to 84.

The sensing step preferably includes digitizing and repetitively sampling the electrical level, and the remapping step includes repetitively calculating a next parameter level of the controlled parameter. The calculation preferably involves determining a next parameter level of the controlled parameter according to the function:

IF:

Control Device$_{(n)}$ ≧ Control Device$_{(n-1)}$,

THEN:

Transition Magnitude$_{(n+1)}$ = Transition Magnitude$_{(n)}$ +

(Control Device$_{(n)}$ − Control Device$_{(n-1)}$) *

$$\left\{ \frac{\text{Transition Magnitude}_{(max)} - \text{Transition Magnitude}_{(n)}}{\text{Control Device}_{(max)} - \text{Control Device}_{(n-1)}} \right\};$$

IF:

Control Device$_{(n)}$ < Control Device$_{(n-1)}$,

THEN:

Transition Magnitude$_{(n+1)}$ = Transition Magnitude$_{(min)}$ +

Control Device$_{(n)}$ *

$$\left\{ \frac{\text{Transition Magnitude}_{(n)} - \text{Transition Magnitude}_{(min)}}{\text{Transition Magnitude}_{(min)}} \right\}.$$

The invention having been disclosed, a number of alternative embodiments will become apparent to those skilled in the art and knowledgeable about this disclosure. Reference should be made to the appended claims rather than the foregoing specification as indicating the true scope of the invention in which exclusive rights are claimed.

We claim:

1. A manually variable control apparatus for setting a magnitude of a controlled parameter between a maximum and a minimum during a period of transition of the parameter defining an effect, the manually variable control apparatus having a control device with a movable part and producing an electrical output which varies in response to position of the movable part, and the controlled parameter being responsive to a magnitude regulator operable to set the level of the controlled parameter in response to an input to the magnitude regulator, the apparatus comprising:

a remapping means operable to digitize the electrical output of the control device and storage means operable to register the level of the controlled parameter, the remapping means providing the input to the magnitude regulator, the remapping means varying the input to the magnitude regulator as a function of changes in the electrical output of the control device during the transition, and the remapping means also mathematically scaling and shifting changes in the input to the magnitude regulator relative to changes in the digitized electrical output of the control device, so that full displacement of the manually variable control device between a minimum and maximum physical position thereof corresponds linearly to a predetermined span of the controlled parameter which predetermined span is less than or equal to a full possible span of the controlled parameter.

2. The apparatus according to claim 1, wherein the remapping means is operable to register a level of an additional parameter related to the controlled parameter, the controlled parameter and the additional parameter being related in such a way that changes in one of said controlled parameter and said additional parameter change a maximum span which is available for variation of the controlled parameter, and wherein the remapping means adjusts endpoints of the desired span of the controlled parameter to constrain the endpoints to remain within said maximum span during the transition.

3. The manually variable control device according to claim 1, wherein the magnitude regulator is a video controller operable to generate a video output signal and the controlled parameter is an attribute of the video output signal to be varied between the endpoints during the effect.

4. The manually variable control device according to claim 1, wherein the remapping means includes a digital processor operable to input the digitized electrical output of the control device, to numerically calculate the scaling and shifting changes, and to output said changes to the magnitude regulator.

5. The manually variable control device according to claim 4, wherein the digital processor repetitively adjusts the magnitude of the controlled parameter by an amount scaled and shifted according to the following calculation, wherein "n"=present sample period, "n+1"=next sample period, and "n−1"=previous sample period:

IF:

Control Device$_{(n)}$ ≧ Control Device$_{(n-1)}$,

THEN:

Transition Magnitude$_{(n+1)}$ = Transition Magnitude$_{(n)}$ +

(Control Device$_{(n)}$ − Control Device$_{(n-1)}$) *

$$\left\{ \frac{\text{Transition Magnitude}_{(max)} - \text{Transition Magnitude}_{(n)}}{\text{Control Device}_{(max)} - \text{Control Device}_{(n-1)}} \right\};$$

IF:

Control Device$_{(n)}$ < Control Device$_{(n-1)}$,

THEN:

Transition Magnitude$_{(n+1)}$ = Transition Magnitude$_{(min)}$ +

Control Device$_{(n)}$ *

$$\left\{ \frac{\text{Transition Magnitude}_{(n)} - \text{Transition Magnitude}_{(min)}}{\text{Transition Magnitude}_{(min)}} \right\}.$$

6. A method for setting a magnitude of a controlled parameter during a user-controlled transition of the controlled parameter defining an effect, comprising the steps of:

defining endpoints for the controlled parameter during a transition of the controlled parameter between the endpoints under control of a manual control device which produces an electrical level as a function of displacement of the control device, the control device having fixed maximum and minimum displacements, the endpoints defining a desired span of transition of the controlled parameter less than or equal to a maximum span of the controlled parameter between maximum and minimum endpoint values;

producing an electrical level by varying a position of the control device over a full span of said displacement of the control device between the maximum and minimum displacements of the control device;

digitizing the electrical level and storing the digitized electrical level in a register;

storing a controlled level of the controlled parameter in a register; and, remapping the electrical level and controlling the controlled parameter to a parameter level passing between said endpoints by regulating displacement of the controlled parameter as a function of the electrical level, the electrical level being first scaled and shifted to make the full span of the control device correspond linearly to the desired span of the controlled parameter within said endpoints.

7. The method of claim 6, wherein the electrical level is repetitively sampled, and the remapping step includes repetitively calculating a next parameter level of the controlled parameter for a next sample period to obtain a linear correspondence between a remaining span of the control device to reach one of the maximum and minimum displacement and a remaining span of the controlled parameter to reach one of the endpoints.

8. The method of claim 7, comprising storing a level of said controlled parameter and at least one additional parameter which is related to the controlled parameter in such a way that changes in said additional parameter affect an available span for variation of said controlled parameter within said maximum and minimum endpoint values, and wherein the remapping step includes constraining the endpoints of the desired span to remain within the maximum and minimum endpoint values.

9. The method of claim 6, wherein the remapping step includes repetitively calculating a next parameter level of the controlled parameter according to the following function, wherein "n"=present sample period, "n+1"=next sample period, and "n−1"=previous sample period:

IF:

Control Device$_{(n)}$ ≧ Control Device$_{(n-1)}$,

THEN:

Transition Magnitude$_{(n+1)}$ = Transition Magnitude$_{(n)}$ +

(Control Device$_{(n)}$ − Control Device$_{(n-1)}$) *

$$\left\{ \frac{\text{Transition Magnitude}_{(max)} - \text{Transition Magnitude}_{(n)}}{\text{Control Device}_{(max)} - \text{Control Device}_{(n-1)}} \right\};$$

IF:

Control Device$_{(n)}$ < Control Device$_{(n-1)}$,

-continued

THEN:

$$\text{Transition Magnitude}_{(n+1)} = \text{Transition Magnitude}_{(min)} + \text{Control Device}_{(n)} * \left\{ \frac{\text{Transition Magnitude}_{(n)} - \text{Transition Magnitude}_{(min)}}{\text{Transition Magnitude}_{(min)}} \right\}.$$

* * * * *

UNITED STATES PATENT AND TRADEMARK OFFICE
CERTIFICATE OF CORRECTION

PATENT NO. : 5,046,030

DATED : September 3, 1991

INVENTOR(S) : David W. Ritter; Anthony E. Zortea; and Douglas C. Crawford

It is certified that error appears in the above-identified patent and that said Letters Patent is hereby corrected as shown below:

On the title page, item (75) Inventors: Please change "David W. Bitter" to read --David W. Ritter--.

Signed and Sealed this

Fifteenth Day of June, 1993

Attest:

MICHAEL K. KIRK

Attesting Officer

Acting Commissioner of Patents and Trademarks